United States Patent
Feketitsch

(10) Patent No.: US 6,355,888 B2
(45) Date of Patent: *Mar. 12, 2002

(54) DEVICE FOR FIXING ELECTRICAL LINES

(76) Inventor: Herbert Feketitsch, Kaiser Friedrich-Str. 40, D-Schechingen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,339
(22) PCT Filed: Apr. 7, 1998
(86) PCT No.: PCT/DE98/00983
§ 371 Date: Oct. 6, 1999
§ 102(e) Date: Oct. 6, 1999
(87) PCT Pub. No.: WO98/47203
PCT Pub. Date: Oct. 22, 1998

(30) Foreign Application Priority Data

Apr. 11, 1997 (DE) ............................. 197 15 070

(51) Int. Cl.[7] ............................................. H02G 15/06
(52) U.S. Cl. ........................................................ 174/78
(58) Field of Search ..................... 174/78, 75 C, 174/88 C, 84 S, 89, 65 R, 65 SS; 439/578, 583, 584, 585

(56) References Cited

U.S. PATENT DOCUMENTS

| | | | | |
|---|---|---|---|---|
| 2,173,643 A | * | 9/1939 | Moser | 174/75 C |
| 3,854,789 A | * | 12/1974 | Kaplan | 439/584 |
| 5,242,316 A | * | 9/1993 | Gartzke et al. | 439/584 |
| 5,432,301 A | * | 7/1995 | Gehring | 174/78 |
| 5,722,856 A | * | 3/1998 | Fuchs et al. | 439/578 |
| 5,917,153 A | * | 6/1999 | Geroldinger | 174/88 C |

FOREIGN PATENT DOCUMENTS

| | | |
|---|---|---|
| DE | 1 949 189 | 4/1971 |
| DE | 38 03 593 | 8/1989 |
| DE | 90 00 964.9 | 5/1990 |
| DE | G 92 04 256.2 | 8/1992 |
| DE | 195 28 234 | 2/1997 |
| EP | 0 598 261 | 5/1994 |
| GB | 2 138 220 | 10/1984 |
| WO | WO 96/30985 | * 10/1996 |

* cited by examiner

Primary Examiner—Chau N. Nguyen
(74) Attorney, Agent, or Firm—Reed Smith LLP

(57) ABSTRACT

An apparatus for securing electrical cables, which have a screen for electromagnetic compatibility (EMC). The apparatus has a retaining body and a contact-maker device, in which case the contact-maker device is arranged inside the retaining body and an electrical connection can be produced between the screen and the retaining body by the contact-maker device. The apparatus is, as a consequence, functionally reliable and results in low production costs, wherein, in the operating state, the screen is connected in a positively locking and/or force-fitting manner, in particular being clamped, between the contact-maker device and the retaining body.

12 Claims, 2 Drawing Sheets

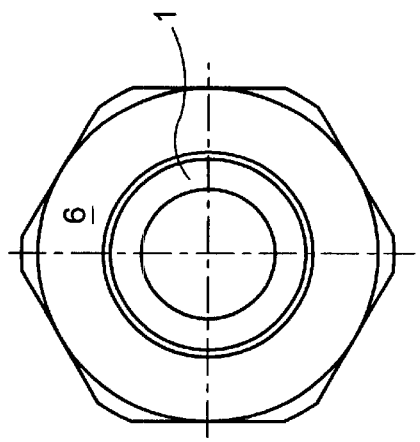
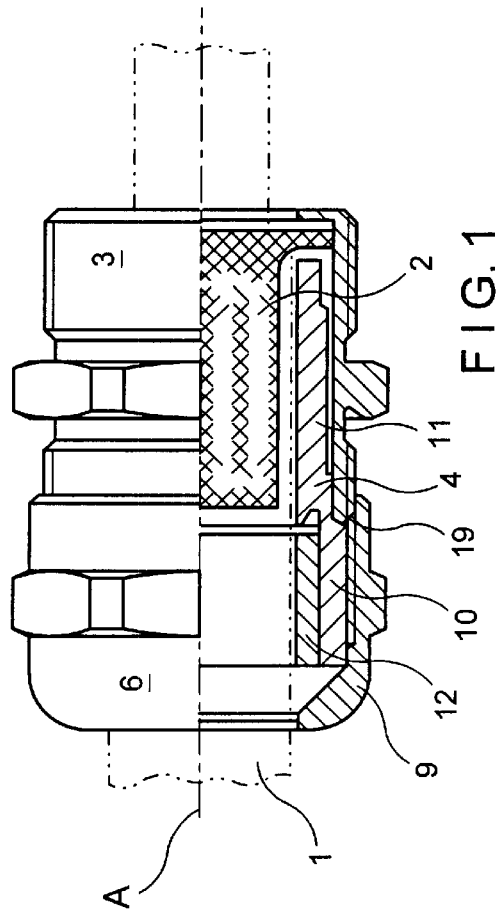
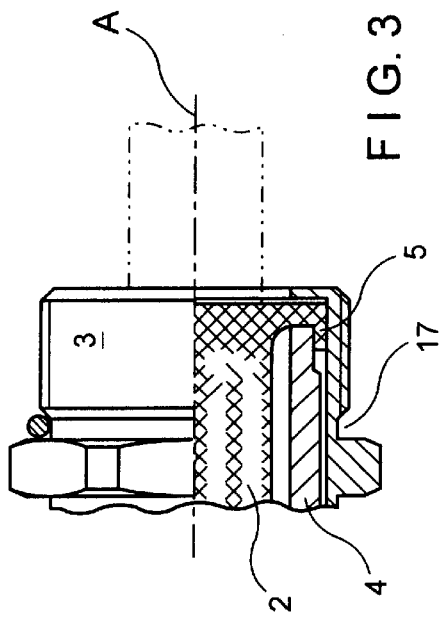

DEVICE FOR FIXING ELECTRICAL LINES

BACKGROUND OF THE INVENTION

1. Field of the Invention

The present invention relates to an apparatus for securing electrical cables, which have a screen for electromagnetic compatibility (EMC), having a retaining body and a contact-maker device, in which case the contact-maker device is arranged inside the retaining body and an electrical connection can be produced between the screen and the retaining body by means of the contact-maker device, in which case, in the operating state, the screen is fixed in a force-fitting manner, in particular being clamped, by means of a tightening element, which acts radially inwards, between the contact-maker device and the retaining body.

2. Description of the Related Art

Electromagnetic compatibility (EMC) of equipment or cables is becoming evermore important with regard to the increasing use, both commercially and in the private field, of electrical or electronic equipment and machines which influence one another by virtue of interference radiation.

Electrical cables equipped with a screen prevent the emission of electromagnetic radiation, since the interference radiation emitted, for example, by the equipment or the assembly, is reliably dissipated to zero potential via the screen. EMC-proof cable installations comprise cable unions which allow an electrical connection to be made between the screen and the equipment housing.

By way of example, a cable union is known in practice, which is equipped with a contact-maker device within the retaining body, in order to produce the electrical connection between the screen and the retaining body. The contact-maker device comprises two conical rings and an endless spring washer. When the compression screw is tightened, the two conical rings act radially inwards onto the spring washer. This reduces the diameter of the spring washer, and the screen makes contact with the cable passing through, whose outer casing has been removed in the contact region. Any electromagnetic interference radiation is passed from the metallic retaining body, via the metallic conical rings and the metallic spring washer, to the screen and, finally, to zero potential.

A problem with this apparatus is that, in mechanical terms, the contact to the screen is produced only by the spring washer resting against the screen. Even a slight reduction in the pressure exerted by the compression screw on the conical rings the [sic] can lead to an interruption in the contact, since the diameter of the spring washer again increases. Furthermore, the production and assembly of the known apparatus or EMC cable union are quite complex owing to the three components—namely two conical rings and a spring washer.

EP 0 598 261 A2 discloses a solution to the problem of securing the electrical contact between the screen and the retaining body by the screen making direct contact with the retaining body and being clamped between the contact-maker device and the electrically conductive retaining body. For this purpose, the screen mesh is exposed and the contact-maker device is then pushed on. The mesh is then bent back, and the clamping process is carried out by means of the retaining body and a tightening element. The clamping process takes place exclusively in the radial direction with respect to the longitudinal axis of the screw union. In addition, the screen must be bent around the contact-maker device in a complex way, thus resulting in an increased assembly effort for connecting the cable to the cable screw union. The retaining body and the screw sleeve have no end face.

OBJECT AND SUMMARY OF THE INVENTION

With this prior art, which is known from EP 0 598 261 A2, as the starting point, the invention is based on the primary object of specifying an apparatus of the type under discussion, which is functionally reliable, results in low production costs and, furthermore, reduces the assembly effort overall.

The above object is achieved in accordance with the invention, an apparatus of the type under discussion which is designed in such a way that the application of force produced by the tightening element on the contact-maker device is directed coaxially with respect to the longitudinal axis of the retaining body, so that the screen is pressed against the end face of the retaining body.

According to the invention, it has first of all in principle been recognized that the assembly effort can be reduced if there is no need to bend the screen around to match the contact-maker device once the cable insulation has been stripped off. Furthermore, it has been recognized that there is no need to bend the screen around if the tightening element applies force to the contact-maker device not only radially but also coaxially. The coaxially directed application of force moves the contact-maker device towards the screen, which is gradually pressed against the end face of the retaining body and, in consequence, is fixed. The preparation of the cable could, for example, be limited to exposing the screen, in which case engagement elements are then provided on the contact-maker device which deform the mesh such that sufficient material is available for clamping. Alternatively, the screen could simply be pushed back and a bead could be formed, against which the contact-maker device is pressed coaxially—without any special engagement elements. In any case, the screen preparation steps which result from the teaching of the prior art of this generic type and increase the assembly effort, comprising weaving the mesh, bending it to the rear, and cutting off the screen, are eliminated in the claimed teaching in favour of reduced assembly effort and thus more cost-effective production, while at the same time ensuring the functional reliability of the claimed apparatus.

A particularly effective connection between the contact-maker device and the screen is produced if the contact-maker device engages in the mesh of the screen and presses the latter against the inner surface, virtually compressing it in the process. If the outer casing of the cable is removed and the screen is just exposed, special engagement elements are required on the contact-maker device, which deform the mesh so that sufficient material is available, which can be clamped between the contact-maker device and the retaining body.

It is of particular advantage with respect to a contact-maker device of simple design and without any special engagement elements for the screen to be pushed back after the outer casing is removed from the cable, so that it forms a bead. The bead extends at right-angles to the longitudinal axis of the cable and parallel to the end face of the retaining body, and offers a good surface for the contact-maker device to act on.

In order to produce the clamped connection between the contact-maker device and the retaining body with the interposition of the screen, the tightening element (which, as is known, is part of the retaining body) is tightened, during which process pressure is applied to the contact-maker device.

According to a preferred exemplary embodiment, the tightening element is a union nut having an internal thread which, at its end facing away from the rest of the retaining body, has an internal design which converges in the direction of this end. This refinement in particular additionally leads to the application of pressure to the contact-maker device, which is directed radially inwards, being supplemented by pressure which is directed coaxially with respect to the longitudinal axis of the retaining body being applied to the contact-maker device according to the invention. The coaxial application of pressure, which is directed at least parallel to the longitudinal axis, results in the contact-maker device being moved towards the screen which, as a result of the convergent internal design, is gradually pressed against the end face of the retaining body, and is fixed by it. As an alternative to the union nut having a convergent internal design, a stepped reduction in cross section would also be possible. Furthermore, instead of a union nut, it would also be possible to use a sleeve or cap which is provided with compression screws acting obliquely or at right-angles with respect to the longitudinal axis and which internally has a configuration of some other type to cause the contact-maker device to move parallel to the longitudinal axis, in the direction of the end face of the retaining body.

From the production point of view and with respect to handling, the contact-maker device is designed in a simple manner—namely as an integral, essentially tubular insert. According to one preferred exemplary embodiment, the entire apparatus according to the invention has essentially only two components—on the one hand the retaining body with the tightening element, and on the other hand the tubular insert.

Since a tightening element which is in the form of a union nut has an internal thread which is screwed onto the external thread of the rest of the retaining body and different internal cross sections are thus present, the contact-maker device has a first section with an external cross section matched to the tightening element and a second section with an external cross section matched to the rest of the retaining body.

Within the region of the tightening element, a sealing ring could be provided which extends between the cable and the first section of the contact-maker device. The contact-maker device could have a special configuration for the sealing ring, in which case the application of pressure (as explained above) coaxially and parallel to the longitudinal axis could also be conducive to particularly effective sealing. According to one refinement of the apparatus according to the invention, the second section (which has a smaller internal cross section) could be used as a stop for the sealing ring that is seated on the first section. The stop could be designed in the form of a circumferential recess, groove or fillet with an acute angle, in which case the free end of the recess, which preferably runs to an acute angle, bores into the sealing ring in the operating state and presses the latter against the tightening element while, for its part, the compression intensifies the contact of the sealing ring on the adjacent surfaces and, on the other hand, a small portion of displaced sealing ring material can extend into the recess.

Expediently, the internal cross sections of the second section of the contact-maker device and of the sealing ring are matched to the external cross section of the cable, in such a manner that, at least during assembly, a small amount of play is present, that [sic] and the cable can be moved relative to the contact-maker device and, possibly, relative to the sealing ring. In order that the apparatus according to the invention can be pushed uniformly onto the cable, the inner surfaces of the sealing ring and of the second section are aligned with one another.

With regard to secure and permanent fixing of the screen, it has been found to be particularly advantageous that the end region of the second section whose end face is to be pressed against the screen and the retaining body is at a radial distance from the inner surface of the retaining body. The small cross-sectional area of the end region increases the magnitude of the force to be transmitted. However, in order to ensure that the contact-maker device is always sufficiently robust, the second section has associated reinforcing elements on its outer surface, which are guided by the inner surface of the retaining body. A further advantage which results from the spacing in the end region of the second section of the contact-maker device is that, in the operating state, at least a small portion of the screen extends into the space and thus also makes contact with the inner side wall of the retaining body. Since the metal mesh of the screen is plastically deformed when the end region is pressed against the inner end wall of the retaining body and, in addition, a portion of the inner surface of the side wall of the retaining body is also permanently made contact with, a contact surface is created which makes permanent contact with the retaining body, so that all the internal and external interference radiation can be reliably dissipated.

The contact-maker device could, furthermore, have on its outer surface an anti-rotation device, which interacts with the retaining body, or its inner surface. The anti-rotation device is preferably formed by a portion which projects like a step on the second section of the contact-maker device, which section engages in a groove on the retaining body and effectively prevents rotation of the contact-maker device about the longitudinal axis in the retaining body.

With regard to the materials, the retaining body and the tightening element are composed, in a known manner, of conductive material, namely metal. The contact-maker device is preferably produced from plastic, having regard to the material costs.

There are now various options for refining and developing the teaching of the present invention in an advantageous manner. In this context, reference is made on the one hand to the claims that are subordinate to Patent claim 1, and on the other hand to the following description of an exemplary embodiment of the invention, with reference to the drawing. Generally preferred refinements and developments of the teaching will also be explained in conjunction with the explanation of the said exemplary embodiment of the invention.

BRIEF DESCRIPTION OF THE DRAWINGS

In the Drawings

FIG. 1 shows a partially longitudinally cutaway illustration of a front view of an exemplary embodiment of the apparatus according to the invention, FIG. 2 shows a side view of the exemplary embodiment shown in FIG. 1, FIG. 3 shows an enlarged illustration of a detail from FIG. 1, with the contact-maker device being located in the operating state, which is shown purely schematically.

DESCRIPTION OF THE PREFERRED EMBODIMENT

Figure 4:
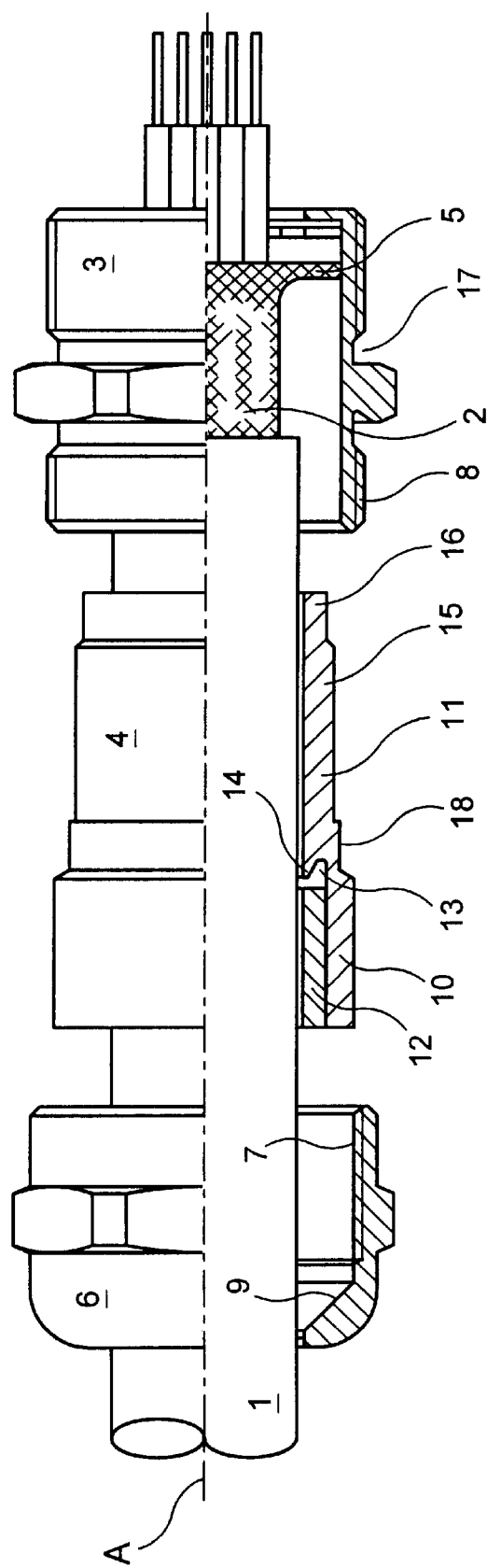
FIG. 4 shows an exploded illustration of the front views of the individual components of the object from FIG. 1.

FIGS. 1, 3 and 4 show an apparatus for securing an electrical cable 1, part of which is shown by dashed lines and having conductors which are not shown in detail and some of which are indicated just by dashed lines. The cable 1 has a screen 2 for electromagnetic compatibility (EMC). The apparatus comprises a retaining body 3 and a contact-maker device 4, which is arranged inside the retaining body 3 and, in principle, has the object of producing an electrical connection between the screen 2 and the retaining body 3.

In FIG. 3, it can be seen that, in the operating state, the screen 2 is fixed in a force-fitting manner between the contact-maker device 4 and the retaining body 3, in this exemplary embodiment being clamped. In this case, FIG. 3 indicates only purely schematically that the contact-maker device 4 engages in the mesh of the screen 2, and presses against the inner surface of the retaining body 3 in order to make contact. In particular, the screen 2 forms a bead 5 on which the contact-maker device 4 acts. The bead 5 is obtained after removal of the outer casing of the cable 1 by stripping the screen 2 off, or folding it back.

The retaining body 3 comprises a tightening element 6 which, in the illustrated exemplary embodiment, is a union nut. The tightening element 6 has an internal thread which is denoted by 7 in FIG. 4 and is screwed onto a corresponding external thread 8 on the retaining body 3, with force being applied to the contact-maker device 4 in order to produce the clamping effect in the operating state. In order to apply force to the contact-maker device 4 in the coaxial direction with respect to the longitudinal axis A (which is common in the operating state) of the apparatus according to the invention, the tightening element 6 has, at its end facing away from the rest of the retaining body 3, a section 9 which is convergent in the direction of this end. The section 9 presses the contact-maker device 4 gradually against the bead 5 as the tightening element 6 is progressively screwed to the retaining body 3. Furthermore, in a known manner, the tightening element 6 causes a force, which is directed radially inwards with respect to the longitudinal axis A, to be applied to the contact-maker device 4.

The contact-maker device 4 is essentially in the form of a tubular insert which has a first section 10 with an external cross section matched to the tightening element 6, and has a second section 11 with an external cross section next to the retaining body 3. The internal cross sections of the two sections 10 and 11 differ. A sealing ring 12 is seated on the larger internal cross section of the first section 11 and its internal cross section is aligned with that of the second section 11 and, like this, is matched to the external cross section of the cable 1.

As can be seen from FIGS. 1 and 4 a recess 13 with an acute angle is formed in the junction region from the first section 10 to the second section 11 and its free end 14, which runs to an acute angle, bores into the sealing ring 12 in the operating state and presses the latter against the tightening element 6, while the displaced sealing ring material can extend into the recess 13. Furthermore, an anti-rotation device 18 (which is illustrated in FIG. 4), reinforcing elements 15 and an end region 16 are provided on the outer surface of the second section 11 of the contact-maker device 4. The end region 16 is pressed by the end face against the screen 2 and the retaining body 3, and is at a radial distance from the inner surface of the retaining body 3. In the assembled state, the reinforcing elements 15 are supported against the inner surface of the retaining body 3. When the components have been assembled, the anti-rotation device 18 engages in a cutout (which is not shown here) on the inner surface of the retaining body 3, and thus prevents the contact-maker device 4 from rotating in the retaining body 3.

Furthermore, in order to provide sealing between the contact-maker device 4 and the retaining body 3, an O-ring 19 (which is illustrated in FIG. 1) is provided, which is arranged to the side of the contact-maker device 4 on the outer surface of the junction region (which is stepped there) between the first section 10 and the second section 11. In the operating state, the free end of that section of the retaining body 3 which has the external thread 8 presses the O-ring 19 into the step which is formed by the larger external cross section of the first section 10 in comparison with the smaller external cross section of the second section 11.

Furthermore, a groove 17 is provided in order to accommodate an O-ring for sealing on the external circumference of the retaining body 3.

Reference is made to the general part of the description with regard to further features which are not shown in the figures.

Finally, it should be mentioned that the teaching according to the invention is not limited to the exemplary embodiment described above. In fact, by way of example, widely differing configurations are possible for the contact-maker device which acts between the screen and the retaining body.

What is claimed is:

1. Apparatus for securing electrical cables comprising:
   a screen provided within said cables for electromagnetic compatibility;
   said apparatus including a retaining body and a contact-maker device, said contact-maker device being arranged inside the retaining body;
   an electrical connection being able to be produced between the screen and the retaining body by the contact-maker device;
   said screen, in an operating state, being connected in a force-fitting manner between said contact-maker device and said retaining body by a tightening element which acts radially inwards;
   said tightening element applying force to the contact-maker device which is directed coaxially with respect to a longitudinal axis of the retaining body, so that the screen is pressed against an end face of the retaining body;
   wherein the contact-maker device engages in a mesh of the screen and presses against the inner surface of the retaining body in order to make contact; and
   wherein the screen is not bent around the contact maker device.

2. The apparatus according to claim 1, wherein the screen forms a bead on which the contact-maker device acts in the operating state.

3. The apparatus according to claim 1, wherein the tightening element is in the form of a union nut and, at its end facing away from the rest of the retaining body, has an internal design which converges in the direction of this end.

4. The apparatus according to claim 1, wherein the contact-maker device is designed as an essentially tubular insert.

5. The apparatus according to claim 1, wherein the contact-maker device has a first section with an external cross section matched to the tightening element and a second section with an external cross section matched to the retaining body.

6. The apparatus according to claim 5, wherein a sealing ring is arranged on the internal cross section of the first section.

7. The apparatus according to claim 6, wherein a recess which has an acute angle is formed in the junction region between the first section to the second section and whose free end, which forms an acute angle, bores into the sealing ring in the operating state and presses the sealing ring against the tightening element, while sealing ring material that has been displaced extends into the recess.

8. The apparatus according to claim 5, wherein the internal cross section of the second section and, possibly, that of the sealing ring as well is or are matched to the external cross section of said cables.

9. The apparatus according to claim 5, wherein the second section has reinforcing elements on its outer surface.

10. The apparatus according to claim 5, wherein the second section, has an antirotation device on the outer surface, which interacts with the retaining body.

11. The apparatus according to claim 5, wherein that end region of the second section whose end face is to be pressed against the screen and the retaining body is at a radial distance from the inner surface of the retaining body.

12. The apparatus according to claim 11, wherein, in the operating state, at least a small portion of the screen extends into a space formed by said radial distance.

* * * * *